Feb. 11, 1958      I. C. ROGERS      2,822,656
HARVESTER HAVING A SPECIFIC PLATFORM ADJUSTING MEANS
Filed Dec. 12, 1955      7 Sheets-Sheet 1

INVENTOR.
Ivor C. Rogers
BY
James E. Nilles
Attorney

Feb. 11, 1958     I. C. ROGERS     2,822,656
HARVESTER HAVING A SPECIFIC PLATFORM ADJUSTING MEANS
Filed Dec. 12, 1955     7 Sheets-Sheet 4

INVENTOR:
Ivor C. Rogers
by James E. Nilles
Attorney

INVENTOR:
Ivor C. Rogers
by James E. Nilles
Attorney

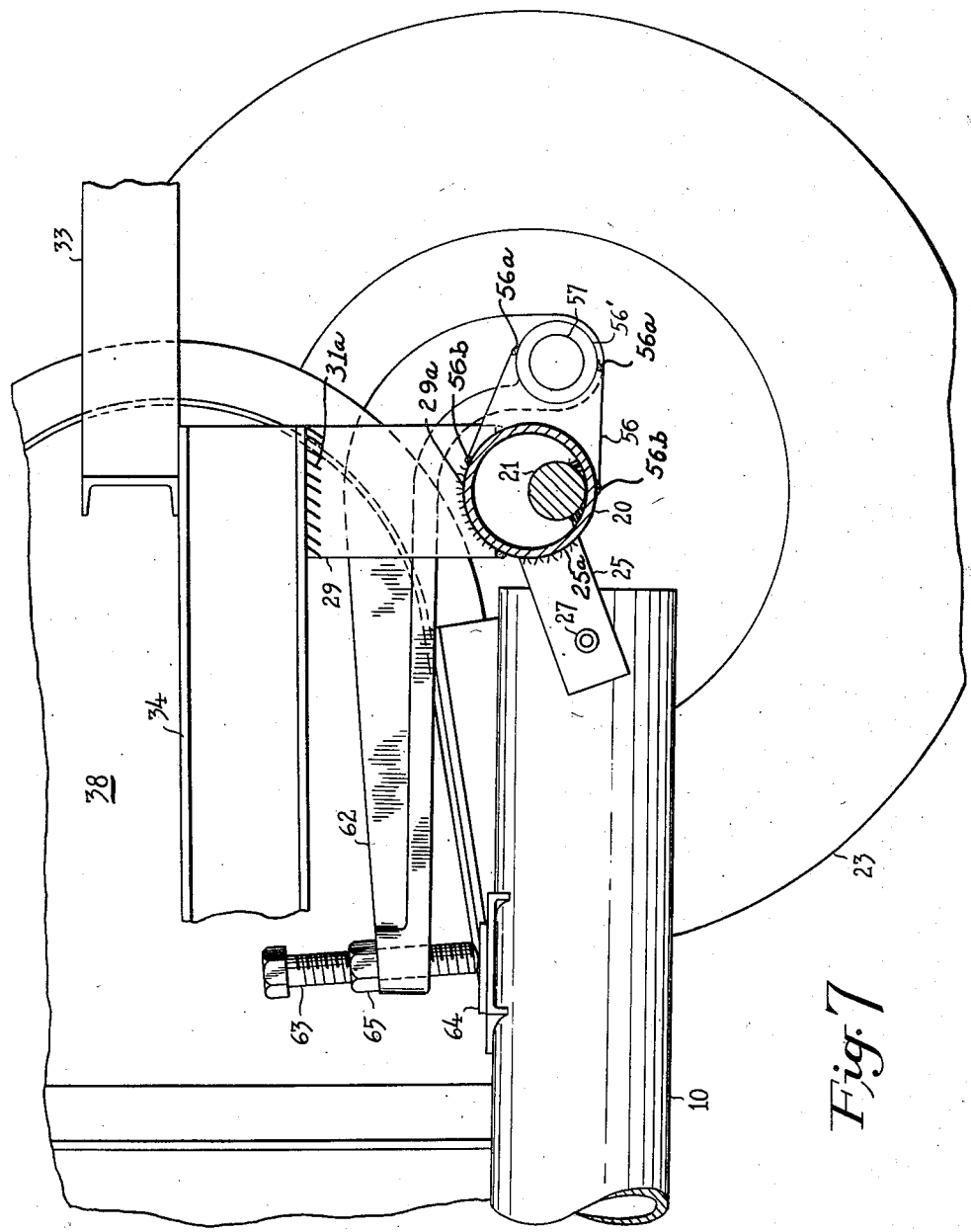

United States Patent Office 2,822,656
Patented Feb. 11, 1958

2,822,656

HARVESTER HAVING A SPECIFIC PLATFORM ADJUSTING MEANS

Ivor C. Rogers, Toronto, Ontario, Canada, assignor to Massey-Harris-Ferguson Inc., Racine, Wis., a corporation of Maryland Application December 12, 1955, Serial No. 552,519

9 Claims. (Cl. 56—208)

This invention relates to agricultural machinery and more particularly to crop harvesters of the type that are adapted to be drawn over the crop, cut the crop and/or pick it up and feed it into the harvester for subsequent operation thereon. In machines of this type, a harvesting table is usually vertically positionable relative to the rest of the harvester for the purpose of cutting the crop at various heights from the ground or for picking up a previously formed windrow which may be in various conditions, i. e., either down in the stubble or supported on the top thereof. A harvester reel, either of the usual bat type or the pick-up type is located above the harvester table to aid in the cutting and the delivery of the crop onto the table. Dependent on the various types of crops and the conditions under which they are harvested, it is desirable to be able to adjust the reel relative to the table in both vertical and fore-and-aft directions. It is also desirable, in many instances, that once the setting between the table and reel is made, this relationship be maintained regardless of the height at which the table is operating.

When harvesting some types of crops, it is advantageous to have the table set at a relatively small angle to the ground and at a low cutting height. Such an arrangement usually results in a harvester designed with a low overall height which presents a problem of ground clearance when transporting the machine.

It is an object of this invention to provide a harvester which meets the foregoing requirements and overcomes the shortcomings and difficulties of prior art structures.

It is an object of this invention to provide a harvester having a crop treating subframe, the front end of which is adjustable in height relative to the ground, and which has a table portion swingably attached to said surframe resulting in considerable flexibility of adjustment. The invention further contemplates novel adjusting and supporting mechanisms and novel means for connecting said subframe and table together.

Another object of this invention is to provide a table-reel unit which is quickly attached to or detached from the rest of the harvester.

Another object of the invention is to provide a table-reel unit in which the reel can be quickly and easily adjusted relative to the table in both vertical and longitudinal directions and at the same time preclude any relative movement therebetween during operation.

It is another object of the invention to provide a novel table of such design which insures efficient and positive delivery of the crop material by the reel along the table and into engagement with other conveying means and at the same time tends to prevent stones and foreign obstacles from entering the machines before the operator can remove them.

Other objects and advantages of this invention will become more apparent from the following detailed description and attached sheets of drawings wherein a form of the invention is illustrated.

Figure 2a is a sectional view taken on the line 2a—2a of Figure 2.

Figure 3a is an elevational fragmentary view, on a further enlarged scale, of the quick detachable joint between the table reel unit and the subframe, indicated diagrammatically in Figure 3.

Figure 7 is a fragmentary, side elevational view, partially in section, and on an enlarged scale of the torsion bar mechanism shown in Figure 1.

Draft frame

Figure 1:
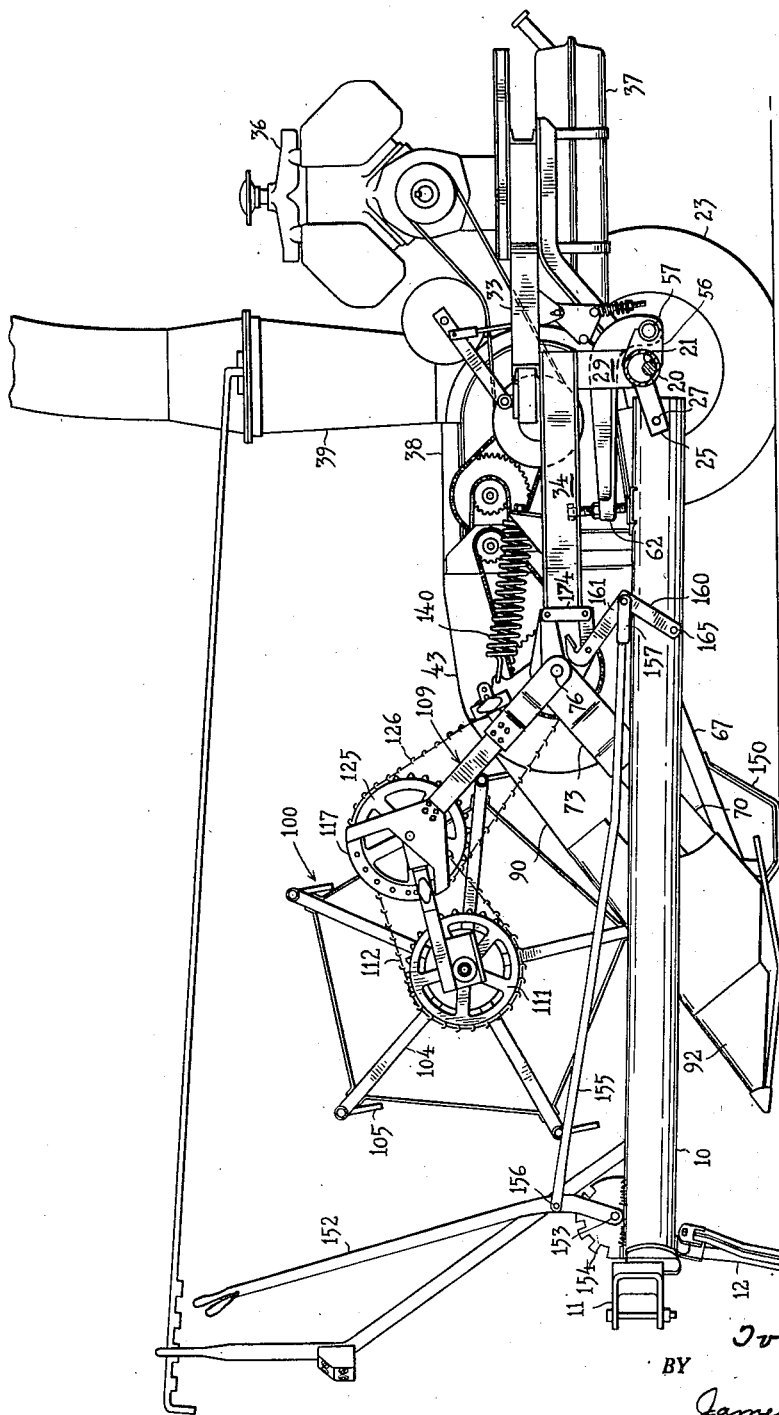
Figure 1 is a left side elevational view of an ensilage harvester made in accordance with this invention, the rear wheel being removed and its axle shown in section.

Referring more particularly to the drawings, a draft frame is provided for attaching the harvester to a propelling vehicle. This draft frame comprises a forwardly extending large tubular tongue member 10 having a clevis 11 at its forward end for attachment to the vehicle. A support stand 12 is pivotally attached adjacent to the forward end of tongue 10 for supporting that end of the harvester when in the inoperative position, as shown in Figure 1. A laterally extending frame member 13 (Figure 2) is rigidly secured as by welding at 14 to tube 10 and extends inwardly and rearwardly, terminating in a bent portion 15. A cross brace 16 is rigidly secured at its ends to tube 10 and member 13 and forms a rigid draft frame therewith.

Sub-frame

Figure 2:
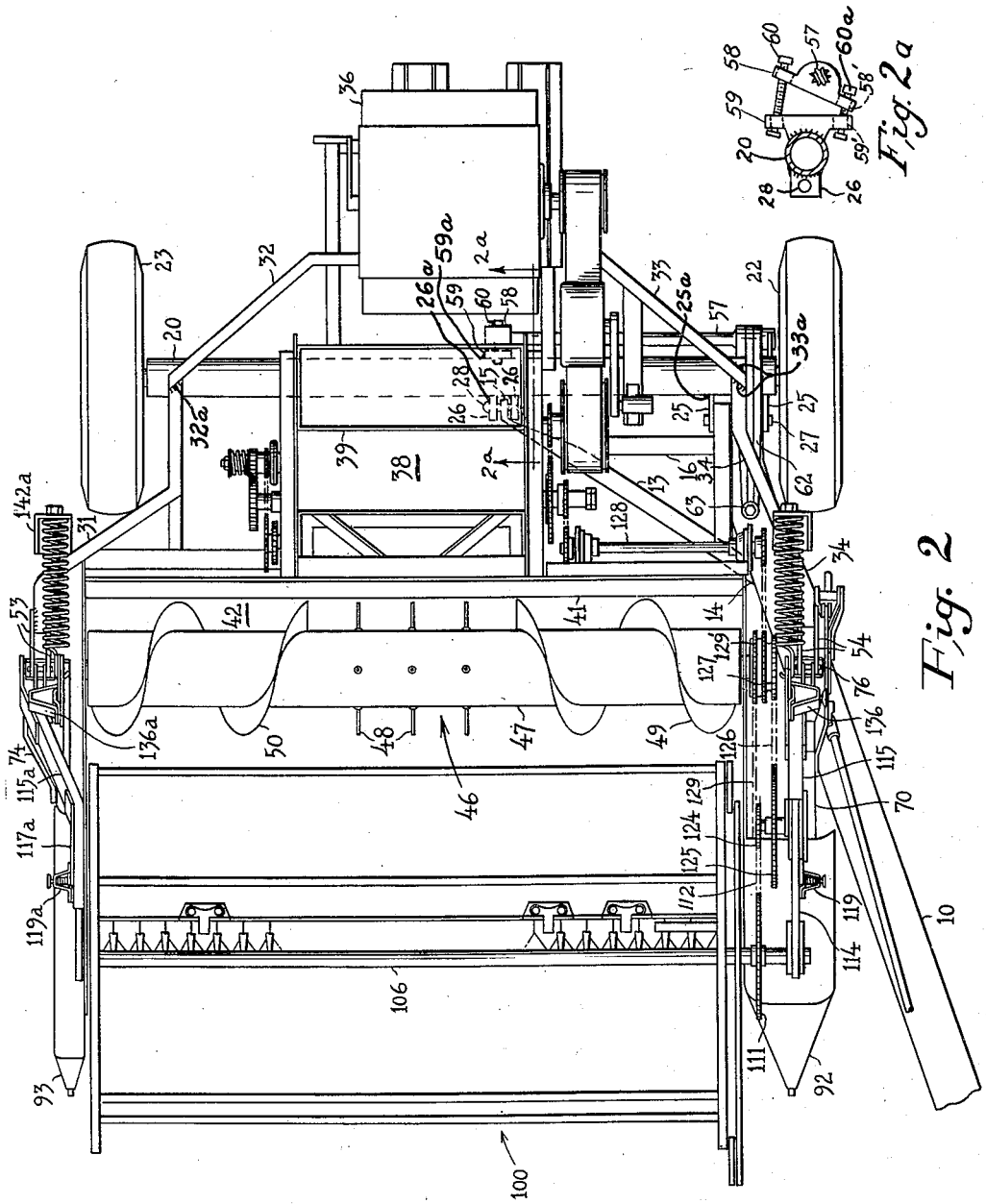
Figure 2 is a plan view of the machine shown in Figure 1, with parts broken away and others removed for the sake of clarity.
Figure 3:
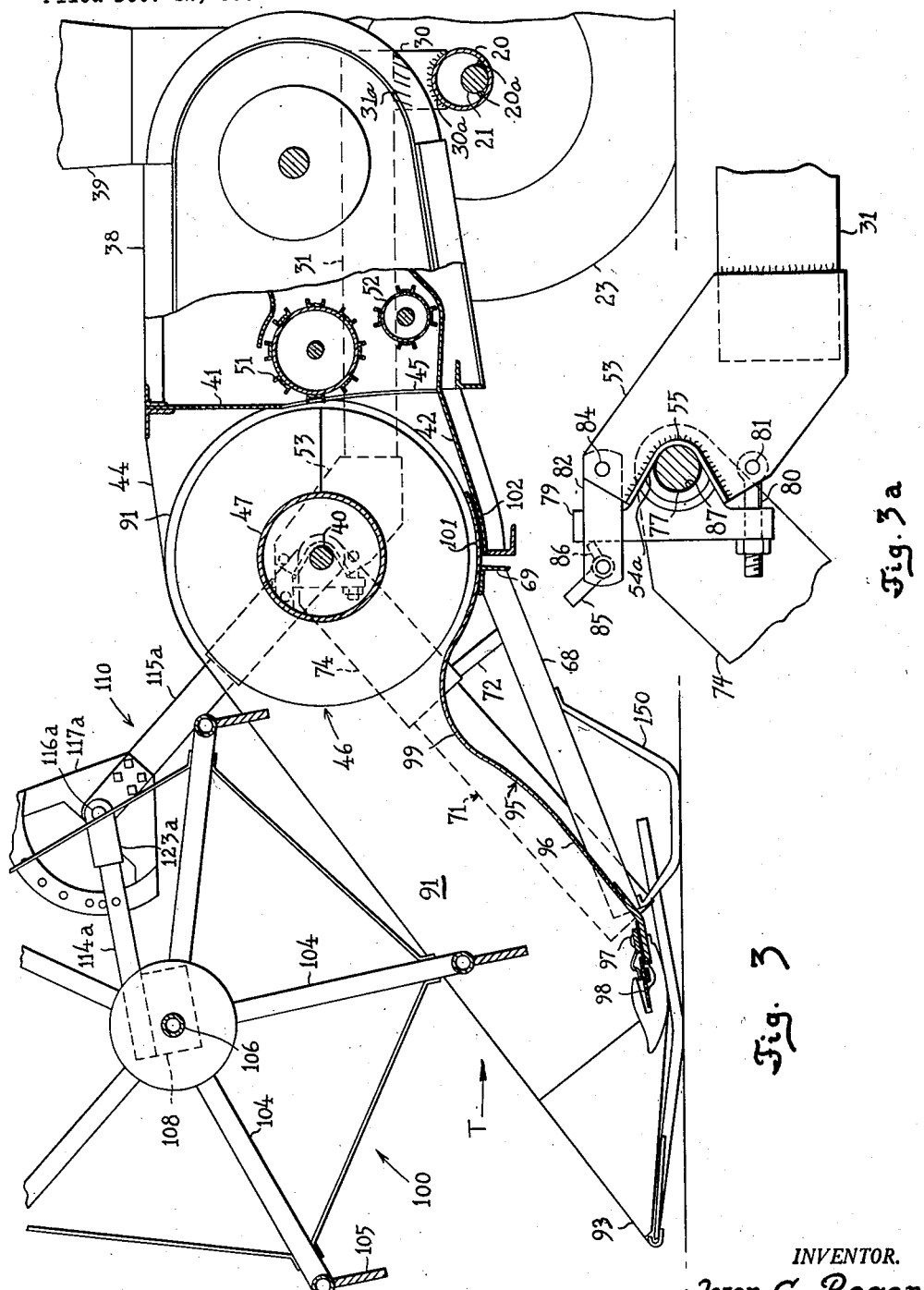
Figure 3 is a side elevational view on an enlarged scale, partially in section of the machine as shown in Figure 1.

A crop treating frame is provided for supporting the major portion of the harvester and is pivotally connected with the draft frame for vertical swinging movement relative thereto, as will presently appear. This crop-treating, or subframe, comprises a transversely arranged axle supporting tubular member 20 within which is welded as at 20a an axle 21 having a ground wheel 22, 23 rotatably mounted on either of its ends extending from tube 20. As best shown in Figure 2, two pairs of lugs 25, 26 are welded to tube 20 at spaced locations. Lugs 25 are welded at 25a to tube 20 and the rear end of tongue 10 is pivotally secured therebetween by means of a pin 27 extending through aligned apertures in the tube 10 and lugs 25. The bent end portion 15 of member 13 is pivotally secured between lugs 26 which are welded at 26a to tube 20, by means of a pin 28 extending through aligned apertures in portion 15 and lugs 26. Also welded to tube 20 at spaced location 29a and 30a respectively are upstanding frame members 29 (Figures 1 and 7) and 30 (Figure 3). A horizontally disposed frame portion is welded to members 29, 30 at 31a and comprises the channel shaped frame members 31, 32, 33 and 34 which are all welded together as at 32a, 33a to form a rigid frame. Thus an integral crop-treating or subframe, is formed which is pivotally attached to the draft frame at 27, 28, as described.

The crop treating mechanism and components parts are supported on the subframe and it is believed only a brief reference to them will be necessary here. The source of power for the harvester is the internal combustion engine 36, its gas tank 37, chopping cylinder housing 38 and delivery spout 39 extending therefrom.

On the forward end of the subframe, and immediately in front of the cylinder housing 38 is a transversely disposed auger platform comprising a rear wall 41, bottom plate 42 and end walls 43, 44 which are all rigidly secured together, in any suitable manner to form an auger trough which is open at its forward side for the reception of crop material, as will appear. The rear wall 41 has an opening 45 (Figure 3) in its central portion which places the auger trough in communication with cylinder housing 38. A lateral conveyor or auger 46 in the form of tube 47 having conventional retractable fingers 48 and left and right hand helical screws 49, 50, is rotatably mounted in end walls 43, 44 on its shaft 40 (Figure 3). Auger 46 serves to receive material at its forward side, convey it laterally from either end to the central fingered portion of the conveyor and force it through opening 45 into the feed rolls 51, 52.

The forward end of the subframe has a socket connection at either side for quick attachment of a harvesting table T, as follows. The forward ends of frame members 31 and 34 have welded thereto, spaced, vertically disposed pairs of plates 53, 54, respectively. As best shown in Figure 3a, the plates of each pair 53, 54 are recessed at their forward sides to form a V-shaped socket 54a across which is welded a plate 55. As this socket joint and its connection with the table-reel unit are similar for both pairs of plates 53, 54, only one will be described as shown in Figure 3a.

Due to the pivotal connection of the subframe to the draft frame at 27, 28, the front end of the subframe, i. e., the auger 46, is capable of vertical swinging about the axle 21. The weight of the subframe and its component parts is appreciable and means are provided to facilitate this vertical swinging adjustment which is in many cases accomplished manually. This means takes the form of a torsion bar 57 which tends to urge the forward end of the subframe in an upwardly direction and thereby counterbalances, to a great extent, the overhanging weight located forward of the axle 21. Bar 57 is rotatably mounted at its outer end in bearing 56' which is welded at 56a to bracket 56 (Figure 7) which in turn is welded to tube 20 as at 56b. The inner end of bar 57 (Figures 2 and 2a) is splined in a bracket 58. A plate 59 is welded at 59a to tube 20 adjacent bracket 58. After bar 57 has been splined within bracket 58, the bracket is secured by bolts 60, 60a to plate 59. By having a splined connection between bar 57 and bracket 58 a certain amount of preload can be applied to bar 57 in the form of torsional stresses. In other words, the mating holes 59' and 58' in plate 59 and bracket 58 respectively through which bolts 60 extend, are larger than their respective bolt diameters and the bracket 58 will be twisted counterclockwise from the position shown in Fig. 2a when the bolts 60 are tightened. Such twisting action creates a preload in bar 57 and tends to urge it to rotate in the opposite, or clockwise direction. While this twisting action takes place, the outer end of bar 57 is prevented from turning as follows. A forwardly extending arm 62 is splined at its rear end to bar 57 and has an adjusting bolt 63 threadably engaged in its forward end. The lower end of bolt 63 bears against plate 64 secured to tongue 10. A locking nut 65 holds the bolt in the adjusted position. By turning bolt 63 in a direction to force the forward end of arm 62 away from the tube 10, the bar 57 is rotated slightly in bearing 56' and additional torsional stresses are set up in bar 57 which tend to urge the entire subframe in a clockwise direction which as viewed in Figure 7. This additional torsional loading insures that proper balancing of the subframe is obtained. The overhanging weight of the forward end of the subframe assembly is such as to maintain the bolt 63 tightly against plate 64.

*Table and reel unit*

The harvesting table framework comprises downwardly and forwardly extending angle iron members 67, 68 located beneath either side of the table (Figures 1, 3 and 5) which are welded at their rear ends to transverse angle member 69 as at 68a. An arm 70, 71 is located at either side of the table and is secured to the rest of the framework by suitable braces 72. The rear ends of arms 70, 71 are formed as bifurcations by pairs of parallel plates 73, 74 respectively. A stub shaft 76, 77 extends through plates 73, 74 respectively and extends outwardly at either side therefrom. As shown in Figure 3a, shafts 76, 77, form pivot portions which are received in their respective quick detachable socket joints formed by curved plates 55 and are detachably held therein by clamps 79. Clamps 79 are swingably attached to their respective plates 53, 54 by eye bolts 80 which extend therethrough and attach to the plates by pins 81. A double link device 82 is pivotally attached at one end to each of plates 53, 54 by pins 84. On the other end of each pair of links 82 is pivoted a lever 85 having a portion 86 which bears against the upper end of clamp 79 to hold it captive. A semi-circular surface 87 of clamp 79 bears against shaft 77 to hold it in the socket 55. By swinging each lever 85 counterclockwise, as shown in Figure 3a, the links 82 may be lifted above clamps 79 which then fall free of their respective shafts. The table T also comprises end walls 90, 91 having the conventional dividers 92, 93 respectively. End walls 90, 91 lie adjacent the inner side of walls 43, 44 respectively as shown best in Figures 4 and 5. A floor or bottom 95 (Fig. 3) is secured to side walls 90, 91 in any conventional manner as by welding or bolt means (not shown). The forward portion 96 of the floor is of relatively steep curved incline. By so forming this portion, rocks or other foreign matter are sifted from the crop material as the latter is pushed up the inclined surface 95, and they then tend to lodge, temporarily at least, in the general area 97 immediately behind the knife 98. This pause in the travel of the rocks often gives the operator sufficient time to notice them, stop the mechanism and remove them before any damage is done to the cylinder. An upwardly curved portion or transverse hump 99 in the floor 95 is also provided immediately forward of the auger 46. This raised portion 99 insures that the material is fed without hesitation from the reel 100 to the auger 46, by eliminating an otherwise "dead" area therebetween. This curved surface and the reversely curved portion 101 of the table, in cooperation with the curved surface 102 of the auger trough, over which it is positioned, affords the auger a longer effective grasp on the crop material and results in positive feeding thereby.

Figure 4:
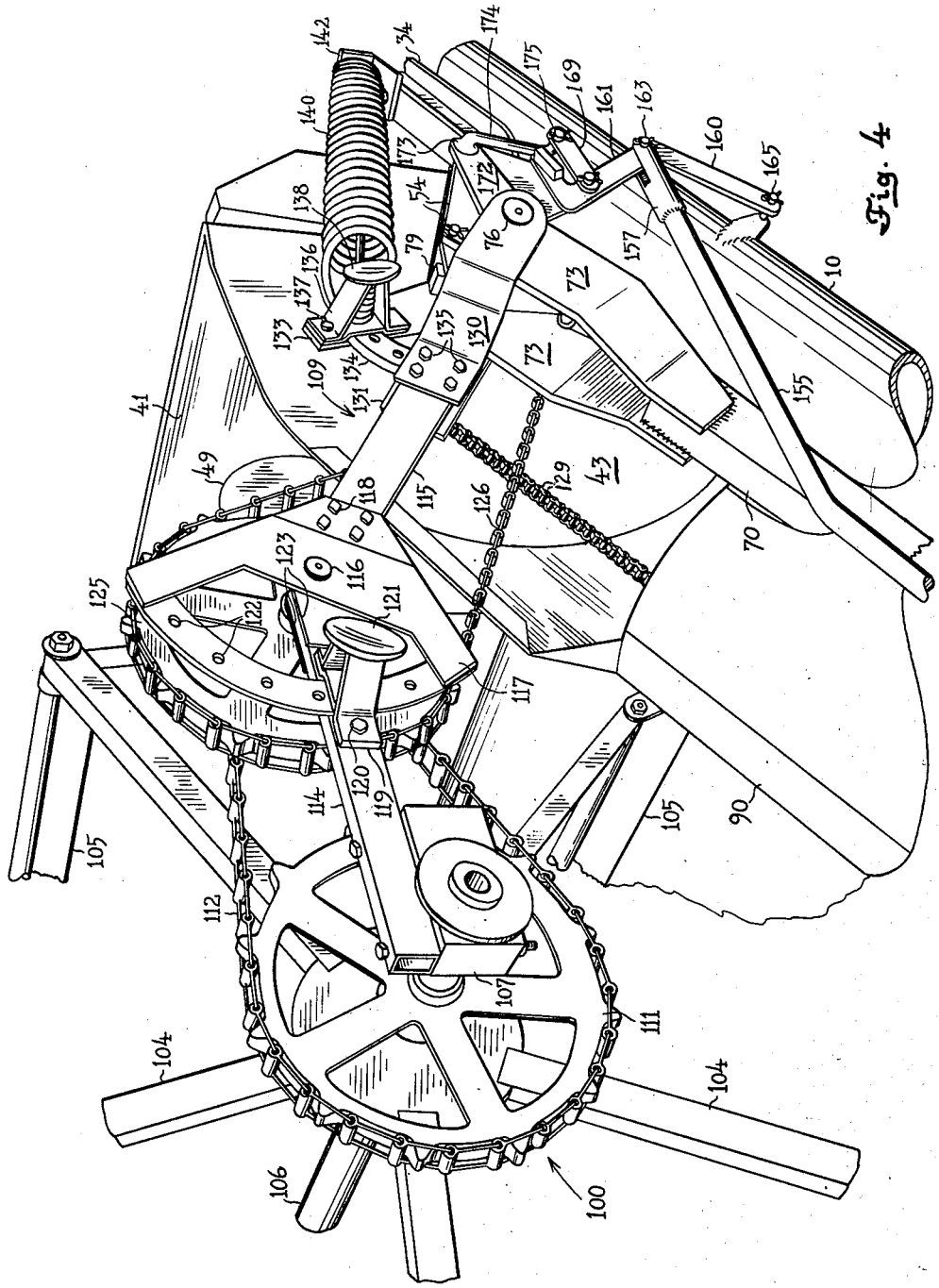
Figure 4 is a fragmentary, perspective view of the left end of the table-reel unit, on an enlarged scale, showing the unit adjusting mechanism and the adjusting means for the reel.
Figure 5:
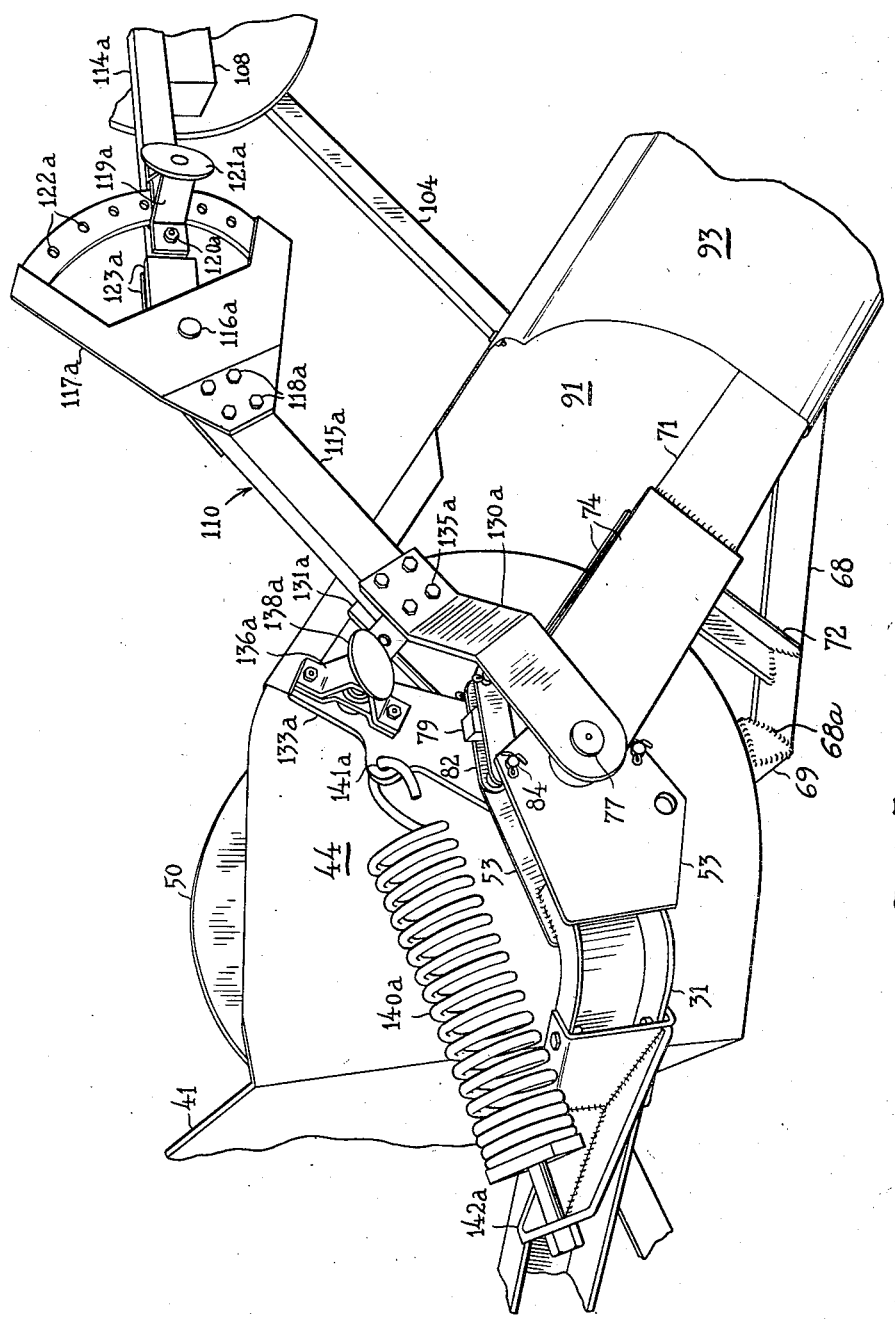
Figure 5 is a fragmentary, perspective view from the right rear side of the table.
Figure 6:
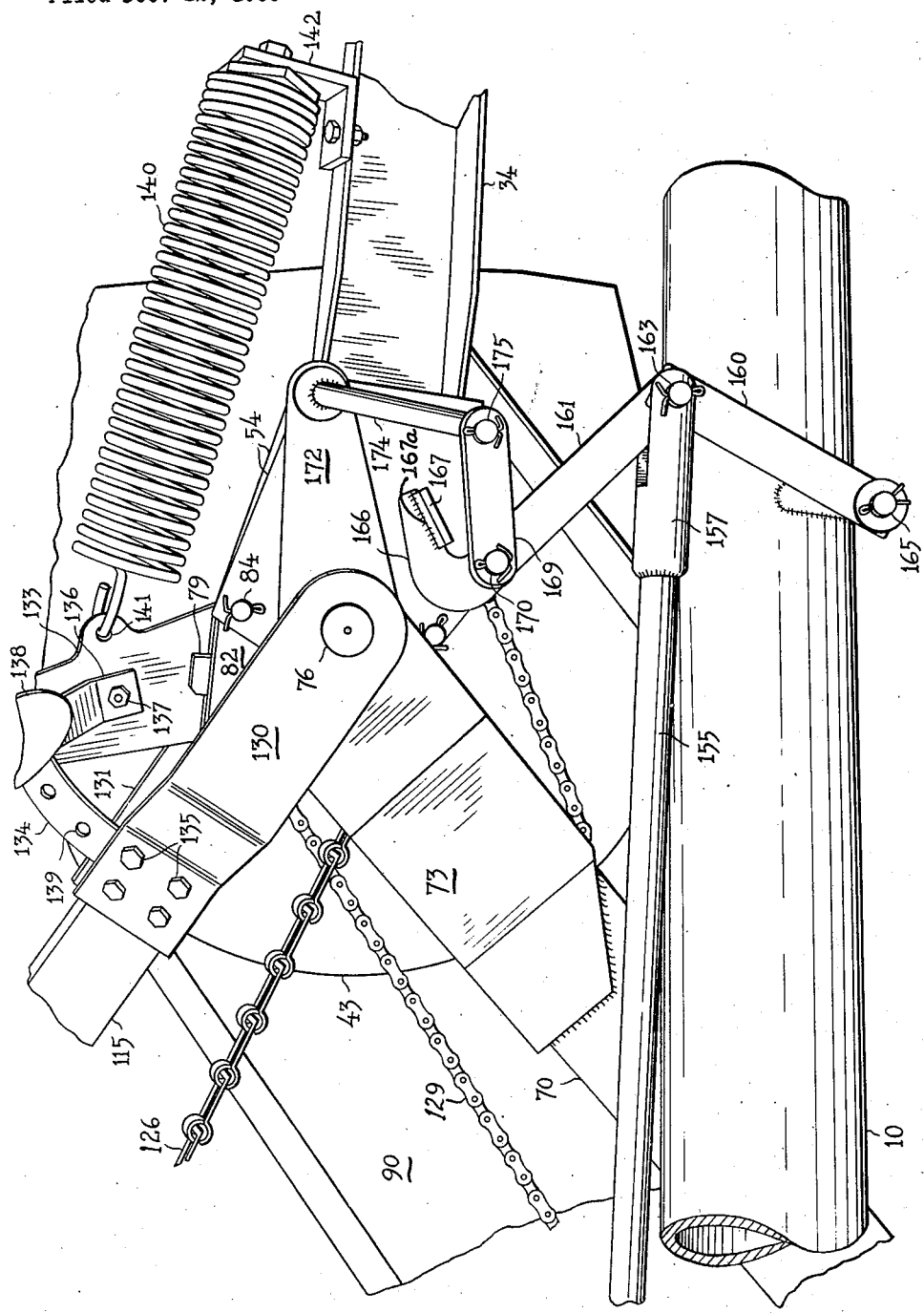
Figure 6 is a fragmentary side elevational view, on a further enlarged scale, of the table-reel unit adjusting linkage.

The reel 100 comprises the spider arms 104 in the outer ends of which are rotatably mounted on the transverse bats 105. The reel shaft 106 is rotatably mounted in the bearing blocks 107, 108 secured to the outer ends of the compound arms 109, 110 respectively as best shown in Figure 4, a large sprocket 111 is secured to shaft 106 and is driven by chain 112. The compound arm 109 comprises a forward section 114 and a rear section 115 which are angularly adjustable, relative to one another, about their pivotal point of connection formed by short shaft 116. A quadrant 117 is secured by bolts 118 to the rear arm section 115. The arm section 114 has a bracket 119 secured thereto by bolts 120 through which extends a plunger 121, the inner end of which is adapted to be engaged in any one of the apertures 122 in the quadrant to hold the arm sections in adjusted position relative to each other. As shown in Figures 3 and 4, the adjustment between the front and rear sections of arms 109 and 110 are similar and like members have been designed with like numerals having the suffix letter a. A pair of spaced plates 123 are welded to the rear end of arm section 114 and shaft 116 extends through aligned holes therein. Sprockets 124 (Fig. 2) and 125 are secured to shaft 116 and chain 112 is trained around sprockets 124 and 111. Another chain 126 extends around sprocket 125 and also around a sprocket 127 on the auger shaft 40. The latter receives its power from a power shaft 128 driven by engine 36 through a power train which needs no further description for purposes of this invention. Chain 129 is trained around sprocket 129' which is also secured to the auger shaft 40 and extends forwardly to drive the knife 98. As the knife drive forms no part of this invention, it is not illustrated here. Since the reel and knife drive are driven from the auger shaft, and the reel, table and cutter-bar pivot about shafts 76, 77 which are coaxialy aligned with shaft 40, center distances are held constant as the table floats on the ground or is raised to transport position. As best shown in Figures 4 and 6, the rear end of rear arm section 115 terminates in a bifurcated portion comprising plates 130, 131 which are rotatably mounted on the outer ends of shaft 76. Rigidly secured to the inner plate 73 of the table arm 70 is an upstanding plate 133. A quadrant section 134 is rigidly secured to arm 115 by bolt means 135 and extends through adjusting bracket 136 secured on plate 133 by bolt means 137. A manually releasable locking pin 138 in bracket 136 extends through apertures 139 in quadrant 134 and secures the reel arm 115 in adjusted position relative to the table arm 70. A large counterbalance spring 140 is secured to plate 133 at 141 (Fig. 6) and at the other end is secured to the bracket 142 of the frame member 34. As shown in Figures 3 and 5, the connection between the reel arm 110 and table arm 71 at the other side of the machine is similar and like members have been designated by similar numerals with a suffix letter *a*.

By means of the compound reel arms 109, 110 and the relative adjustment between these reel arms and the table arms 70, 71 the reel may be fiexdly adjusted in a variety of positions relative to the table, and more particularly relative to the cutter bar, in both a vertical and fore-and-aft direction. For pick-up reel work the lower positions are used and for conventional bat reel work the higher positions would be used. Furthermore, the table and reel are adjusted, relative to the ground, together as a unit when the machine is in operation. The table-reel unit may be quickly detached from the subframe by simply releasing levers 85. The auger remains drivingly connected on the subframe and the socket joints can receive other harvesting elements. The means for adjsting the table-reel unit for various cutting heights and for raising the unit to transport position, will now be described.

*Table and subframe adjusting mechanism*

Under some operating conditions ground shoe 150 of the table will be in contact with the ground and thereby support the table at the lowest cutting height. This is the position shown in the figures and under these circumstances the table is free to rise and fall and follow the contour of the ground.

For other conditions the minimum cutting height of the table can be adjustably fixed in a plurality of vertical positions, but leaving the table free to rise, if necessary. This adjustment, in the embodiment of the invention shown, is accomplished manually by the upstanding lever 152 which is pivoted at 153 to the quadrant 154 which in turn is rigidly secured to the tonque 10. The lever 152 may be adjustably fixed by a ratchet (not shown) engaging the detents of the quadrant in the well known manner. Lever 152 is within easy reach of the operator when he is on the tractor seat. A long control rod 155 is pivotally attached at 156 to the lever and extends rearwardly, terminating in a bifurcated portion 157.

As best shown in Figures 4 and 6, a toggle mechanism comprises links 160 and 161 which are pivotally connected to the bifurcated portion 157 by means of pin 163. The lower end of link 160 is pivoted to tongue 10 on the stub shaft 165 which in turn is secured to tongue 10 in any suitable manner. The upper end of link 161 is formed as a hook portion 166 having a bearing plate 167 welded thereto as at 167*a*. A pin 170 is secured to outer plate 54 and extends outwardly therefrom. Link 169 and link 161 are pivotally mounted on pin 170. The outer plate 73 of the table arm 70 has a rearwardly extending integral arm 172 having an aperture at its rear end through which extends the upper bent portion 173 of link 174 for rotation therein. The lower end of link 174 has another bent portion 175 which is pivotally supported in an aperture in the other end of link 169. Movement of the lever 152 to the left as viewed in Figure 1, causes the rod 155 to straighten the toggle linkage formed by links 160 and 161, thus forcing pin 170 and the forward end of the subframe upwardly. In other words, during the first phase of linkage means movement, that is, in passing from the non-aligned position shown in Figure 6 to a substantially aligned or straight position, the toggle links 160 and 161 cause only the forward end of the subframe to be swung upwardly about the axle 20 as an axis. The front edge of the table, however, remains adjacent the ground because the compound link 169, 174 can transmit no downward force on arm 172. Further movement of lever 152 to the left causes bearing plate 167, which forms a one-way stop connection, to continue to rotate in a clockwise direction (Fig. 6) about fixed pin 170 and to bear against the link 169 thus forcing it downwardly. This second phase of linkage movement pulls link 174 and the rear end of plate 172 downwardly about shaft 76. This causes the front edge of the table to swing upwardly about shaft 76 and it can be held at various cutting heights by the lever and quadrant.

With this linkage arrangement the forward end of the crop-treating frame is raised prior to the raising of the table. This gives additional clearance between the ground and the front end of the subframe which permits cutting at a considerable distance from the ground. When the lever 152 is moved all the way to the left, as viewed in Figure 1, the subframe is at a good transport height and the cutter bar at its maximum height. This also permits linkage adjustment of the angle of the cutter bar and table relative to the ground when cutting at the lower heights. In other words, the correct cutter bar attitude and table inclination, relative to the ground, can be obtained for the crop condition encountered. Improved pick-up characteristics, for various harvesting conditions can be thus effected.

What is desired to be secured by Letters Patent is:

1. An ensilage harvester comprising, a draft frame, a crop-treating subframe pivotally mounted on said draft frame and having a forward end that is vertically swingable relative to said draft frame, a harvesting table having a rear end pivotally mounted to the forward end of said subframe for vertical swinging movement relative to said subframe, adjustable linkage means connected between said draft frame, said subframe and said table whereby only the forward end of said subframe is raised during a first phase of linkage means movement and the forward end of said table is raised during a second phase of said means movement.

2. A device as defined in claim 1 further characterized in that said linkage means comprises, a toggle link pivotally connected to said draft frame and to said subframe, a compound link connected to said subframe and said table, said toggle and compound links having a one-way stop connection therebetween whereby during said first phase of movement said toggle link moves independently of said compound link and during said second phase of movement said one-way stop connection causes said compound link to move said table.

3. A device as defined in claim 1 including, a torsion bar connected to said draft frame and said subframe, adjustable means for applying a pre-load stress to said bar tending to urge the said forward end of said subframe in an upwardly direction.

4. A harvester comprising, a crop-treating subframe having a transversely arranged auger platform at its forward end, a conveyor auger rotatably mounted in said platform, a harvesting table detachably and pivotally secured to the forward end of said subframe about an axis which is coaxially aligned with said auger, means for vertically adjusting said table relative to said subframe.

5. A harvester comprising, a crop-treating subframe having a transversely arranged auger platform at its forward end, a conveyor auger rotatably mounted in said platform, a harvesting table detachably and pivotally secured to the forward end of said subframe about an axis which is coaxially aligned with said auger, said table having a floor extending from adjacent the forward end of said table rearwardly and upwardly and terminating beneath said auger, a transversely extending raised portion in said floor located immediately forward of said auger, means for vertically adjusting said table relative to said subframe.

6. A harvester comprising, a crop-treating subframe having a transversely arranged auger platform at its forward end, a conveyor auger rotatably mounted in said platform, a quick detachable socket connection at either side of forward end of said subframe and in axial alignment with said auger, a harvesting table having pivot portions at either side adapted to be detachably held by said socket connections, means for vertically swinging said table about said pivot portions.

7. An integral harvesting table-reel unit for a harvester of the type having a vertically adjustable crop-treating subframe, said unit including, a table having a pivot shaft at either side and adjacent its rear end, said shafts adapted to be detachably and rotatably secured to said subframe, a reel arm pivotally secured at its rear end to each of said shafts and having a reel rotatably mounted at their forward ends, said reel positioned above the forward end of said table, adjustable means between said table and said arms whereby the reel may be vertically adjusted relative to said table.

8. A device as defined in claim 7 further characterized in that each of said arms comprise, a rear section pivotally secured at its rear end to its said respective shaft, a front section rotatably supporting said reel at its front end, said sections pivotally secured together adjacent their other ends to form a compound arm, second adjustable means connected between said sections whereby their angular relationship relative to one another may be varied.

9. An ensilage harvester comprising, a draft frame, a crop-treating subframe pivotally mounted on said draft frame and having a forward end that is vertically swingable relative to said draft frame, said forward end having a conveyor auger rotatably mounted thereon, a harvesting table having a rear end pivotally mounted to the forward end of said subframe and on an axis which is coaxially aligned with said auger for vertical swinging movement relative to said subframe, adjustable linkage means connected between said draft frame, said subframe and said table whereby only the forward end of said subframe is raised during a first phase of linkage means movement and the forward end of said table is raised during a second phase of said means movement.

References Cited in the file of this patent
UNITED STATES PATENTS

| | | |
|---|---|---|
| 1,794,720 | Maysent | Mar. 3, 1931 |
| 2,507,719 | Kane et al. | May 16, 1950 |
| 2,509,357 | Krause | May 30, 1950 |
| 2,638,728 | Balzer et al. | May 19, 1953 |
| 2,689,442 | Heth | Sept. 21, 1954 |